US009400659B2

(12) United States Patent
Mumford et al.

(10) Patent No.: US 9,400,659 B2
(45) Date of Patent: Jul. 26, 2016

(54) GRAPHICAL USER INTERFACE WINDOW ATTACHMENT

(75) Inventors: Gregory L. Mumford, Marion, IA (US); Mariano Rivera, Capital Federal (AR)

(73) Assignees: Verizon Patent and Licensing Inc., Basking Ridge, NJ (US); Verizon Argentina S.R.L., Buenos Aires (AR)

( * ) Notice: Subject to any disclaimer, the term of this patent is extended or adjusted under 35 U.S.C. 154(b) by 1034 days.

(21) Appl. No.: 12/569,628

(22) Filed: Sep. 29, 2009

(65) Prior Publication Data

US 2011/0078625 A1 Mar. 31, 2011

(51) Int. Cl.
*G06F 3/048* (2013.01)
*G06F 9/44* (2006.01)
*G06F 3/0481* (2013.01)

(52) U.S. Cl.
CPC ............ *G06F 9/4443* (2013.01); *G06F 3/0481* (2013.01)

(58) Field of Classification Search
CPC .......... G06F 9/54–9/548; G06F 3/048; G06F 3/0481; G06F 3/04842; G06F 5/14; G06F 9/4443; G06F 9/4445; G09G 5/14; G06Q 10/10
USPC .................. 715/788, 803–805; 719/313–320
See application file for complete search history.

(56) References Cited

U.S. PATENT DOCUMENTS

| | | | | |
|---|---|---|---|---|
| 5,455,904 A * | 10/1995 | Bouchet et al. | ............... | 715/798 |
| 5,889,522 A * | 3/1999 | Chew et al. | ................... | 715/781 |
| 6,025,841 A * | 2/2000 | Finkelstein et al. | .......... | 715/803 |
| 6,411,310 B1 * | 6/2002 | Berquist et al. | ............... | 715/764 |
| 6,563,512 B1 * | 5/2003 | Azami et al. | ................... | 345/619 |
| 6,611,878 B2 * | 8/2003 | De Armas et al. | ............ | 719/328 |
| 7,149,968 B1 * | 12/2006 | Ackerschewski et al. | ..... | 715/255 |
| 7,325,204 B2 * | 1/2008 | Rogers | .......................... | 715/792 |
| 7,346,855 B2 * | 3/2008 | Hellyar et al. | ................ | 715/783 |
| 8,607,157 B2 * | 12/2013 | Shibata | ................ | G06F 3/0481 715/781 |
| 2005/0055458 A1 * | 3/2005 | Mohan et al. | ................. | 709/238 |
| 2006/0041848 A1 * | 2/2006 | Lira | .............................. | 715/805 |
| 2006/0075359 A1 * | 4/2006 | Bauchot et al. | ............... | 715/790 |
| 2007/0050719 A1 * | 3/2007 | Lui et al. | ........................ | 715/762 |
| 2007/0079252 A1 * | 4/2007 | Ramnani | ....................... | 715/781 |
| 2007/0101291 A1 * | 5/2007 | Forstall et al. | ................ | 715/805 |
| 2008/0046843 A1 * | 2/2008 | McKeon | ............... | G06F 9/4443 715/853 |
| 2009/0235204 A1 * | 9/2009 | Kaehler et al. | ................ | 715/804 |
| 2011/0004851 A1 * | 1/2011 | Nurmi et al. | .................. | 715/853 |

* cited by examiner

*Primary Examiner* — Haoshian Shih (57) ABSTRACT

A method includes identifying a first graphical application window and a second graphical application window. The first graphical application window and the second graphical application windows are each associated with separate applications. An attachment relationship may be defined between the first and second graphical application windows. A command may be received to manipulate the first graphical application window. A correlating command then manipulates the second graphical application window according to the attachment relationship between the first window and the second window, such that a spatial relationship between the first and second graphical application windows is maintained.

22 Claims, 7 Drawing Sheets

GRAPHICAL USER INTERFACE WINDOW ATTACHMENT

BACKGROUND

Many computing devices provide a graphical user interface. In addition, such computing devices often allow a user to run multiple applications simultaneously, including allowing a user to use multiple application windows. For example, a user may open multiple windows of one application, display multiple windows of different applications, move and resize windows, or any of a variety of other activities involving a plurality of application windows. However, it can be difficult to work with multiple windows, particularly when attempting to view different windows at the same time.

DETAILED DESCRIPTION

Figure 1:
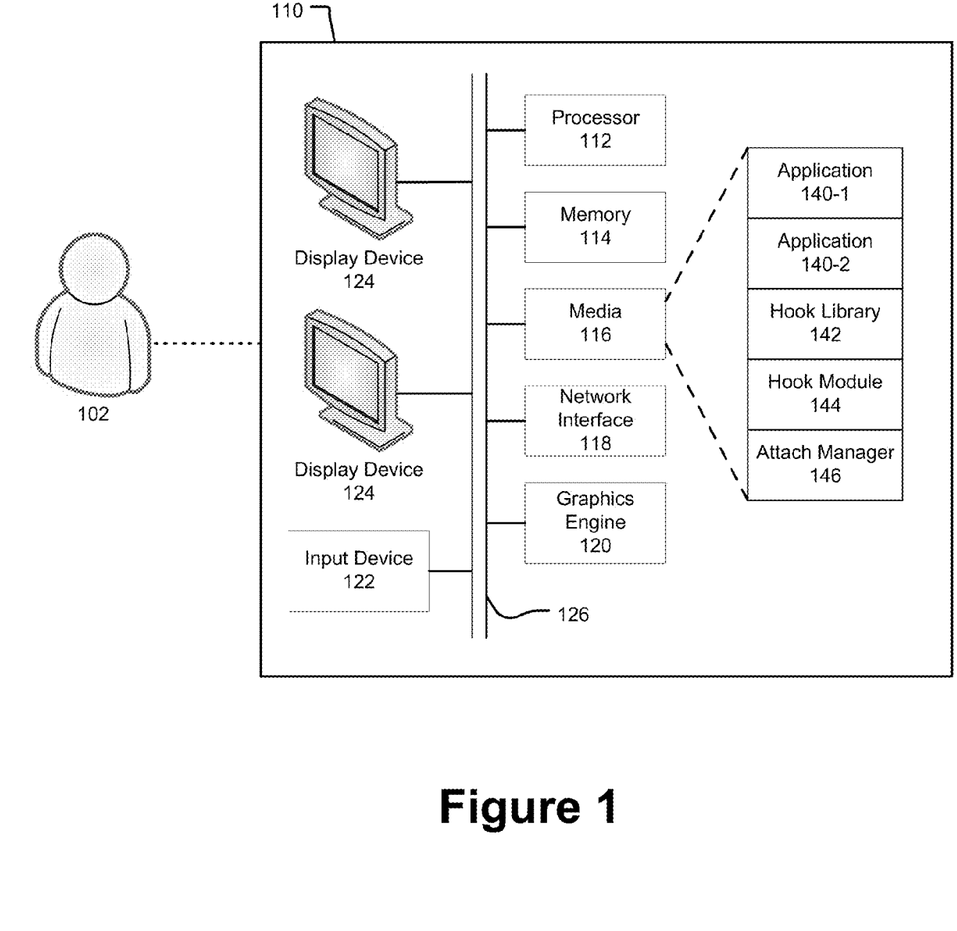
FIG. 1 illustrates an exemplary computing device capable of providing a graphical user interface to a user.

FIG. 1 illustrates an exemplary computing device 110 for providing a graphical user interface to a user 102. More specifically, computing device 110 provides a graphical user interface where applications can utilize one or more graphical application windows. Further, computing device 110 allows an application to attach its own graphical application window to the graphical application window of another, separate application. The two applications are essentially separate in that one is not integrated with the other, such as by being a plug-in, add-on, or extension of the other application. However, once an application window is attached to another application window, any actions (e.g., moving, resizing, or minimizing) that user 102 takes with respect to one application window may also affect the other application window, such as by maintaining a spatial relationship between the displayed windows. Thus, while the two applications are separate, their attached windows essentially mimic an integrated graphical application window, such as by maintaining their physical proximity to one another, and opening and closing together.

Computing device 110 can be one or more of any computing device capable of providing a graphical user interface to user 102 via one or more display devices 124. For example, computing device 110 can be one or more of a number of computing devices, including, without limitation, a computer workstation, a desktop, a notebook, a laptop, a netbook, a handheld computer, a mobile device such as a "smart" phone, a cellular telephone, a personal digital assistant, a personal digital assistant mobile telephone, and a set-top box (STB). Computing device 110 typically includes hardware, software, or a combination of hardware and software to provide user 102 with a graphical user interface via display device 124. While an exemplary computing device 110 is shown in FIG. 1, the exemplary components illustrated in FIG. 1 are not intended to be limiting. Indeed, additional or alternative components and/or implementations may be used.

Computing device 110, as illustrated in FIG. 1, typically includes a processor 112, memory 114, a computer-readable or processor-readable media 116, a graphics engine 120, and one or more input devices 122, which may communicate with one another using a system bus 126. Computing device 110 may also connect to one or more display devices 124, allowing a user 102 to view a graphical user interface. Further, computing device 110 may communicate with other computing devices and/or systems via a network utilizing a network interface 118, such as a wired or wireless network.

Computing device 110 includes at least two separate applications 140-1, 140-2, where each application provides a graphical application window. Applications 140-1, 140-2 are separate in that they are not integrated with one another in that one is not an extension or add-on of another. For example, applications 140-1, 140-2 can be independent of one another in that the two applications do not share common executable files, library files, or some other common software base code. Applications 140-1, 140-2, as well as one or more operating systems, programs, system elements, and/or modules, may be implemented as computer-readable instructions (e.g., software) and stored on computer-readable media 116, as illustrated in FIG. 1.

Computing device 110 also includes a hook library 142, a hook module 144, and an attach manager 146 to facilitate attaching a window from application 140-1 to a window of application 140-2, and to manage the attached windows. Attaching windows to one another generally includes defining an attachment relationship between the windows, such as a pre-defined physical proximity or spatial relationship. The attached windows are then manipulated according to that attachment relationship, for example, such that the attached windows move together nearly simultaneously to maintain the pre-defined physical proximity according to the attachment relationship. Thus, certain actions, events, or commands that affect one window (e.g. moving) may also affect any attached windows.

Generally, each window is manipulated through various commands, such as commands generated in response to a user 102 using an input device 122. Generally, a command affecting one window will not affect another window from a separate application. However, once two windows are attached, commands affecting one window may also affect the other, attached window. For example, if user 102 uses a mouse to click-on and drag one window, the attached window will follow, thus maintaining a pre-determined spatial relationship or physical proximity between the windows.

Such commands to manipulate a window are commonly encompassed in messages, such as those native to an operating system such as any of the Microsoft Windows® operating systems. Messages generally include information and/or commands regarding the graphical application windows. For example, messages may include information about the size, location, and orientation of a window. Messages may describe the location of a window in terms of a local coordinate system, such as X-Y coordinates, and potentially Z coordinates as well (such as a Z-order of windows). A local coordinate system may define a window's location in terms of a point on a window, or some other relative location. Computing device 110 may also include a global coordinate system that describes a viewable surface of display device(s) 124, and messages may include a description of a window's location in terms of X-Y coordinates with respect to the global coordinate system. In addition, messages may further describe a window in terms of a Z location or Z-order. For example, computing device 110 may use a Z-order or Z location of a window to determine virtual depth of a window, such as by determining whether to place the window in front of or behind another window. For example, each window may be assigned a number indicating that window's Z-order. Messages may also include commands to manipulate a window, such as by moving, opening, closing, and resizing a window.

Generally, hook library 142 and hook module 144 monitor and pass certain messages to attach manager 146, such as by filtering messages that are intended for one or more windows and/or applications. Attach manager 146 then analyzes the message and, if necessary, generates a correlating command, which may be encompassed in a message, to manipulate an attached window. A correlating command or correlating message is then sent to an attached window to ensure that the attached window or windows behave according to a pre-defined relationship, such as by being moved together to maintain their physical proximity. Attach manager 146 typically includes logic identifying windows and/or applications and their attachment relationships. Attach manager 146 can then generate a correlating command or message based on the logic concerning the identified windows and their attachment relationship. Hook library 142, hook module 144, and attach manager 146 may be implemented in software stored in media 116 and implemented by processor 112.

Processor 112 is generally any electronic circuit that can execute one or more computer programs. For example, processor 112 can be a central processing unit (CPU), a microprocessor, a microcontroller, an application-specific integrated circuit (ASIC), or any other appropriate processor that is capable of appropriate execution. Generally, processor 112 receives executable instructions from memory 112 and/or media 116. Computing device 110 further includes instructions executable by one or more computing devices such as those listed above. Computer-executable instructions may be compiled or interpreted from computer programs created using a variety of well-known programming languages and/or technologies, including, without limitation, and either alone or in combination, Java™, C, C++, Assembly, Visual Basic, Java Script, Perl, etc. In general, processor 112 (e.g., a microprocessor) receives instructions, e.g., from memory 114 and computer-readable medium 116, and executes these instructions, thereby performing one or more processes, including one or more of the processes described below. Such instructions and other data may be stored and transmitted using a variety of known computer-readable media 116.

Computer-readable medium 116 (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, include a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, and any other medium from which a computer can read.

In general, computing device 110 employs any of a number of well-known computer operating systems, including, but by no means limited to, known versions and/or varieties of mobile operating systems, any of the Microsoft Windows® operating systems, the Unix operating system (e.g., the Solaris® operating system distributed by Sun Microsystems of Menlo Park, Calif.), the AIX UNIX operating system distributed by International Business Machines of Armonk, N.Y., and the Linux operating system. Further, computing device 110 may utilize one or more applications for managing a graphical user interface, such as the X Windows system.

Generally, computing device 110 utilizes one or more graphics engines 120 to manage a graphical user interface. Graphics engine 120 may be implemented in hardware and/or software. For example, graphics engine 120 may rely on a portion of any of the above-mentioned operating systems, a separate graphical user interface program, or any combination of the two in one illustrative example. For example, graphics engine 120 may be included in an operating system of a computing device 110, such as a portion of the operating system that is responsible for rendering, ordering, and manipulating graphical application windows. Generally, graphics engine 120 allows user 102 to use one or more graphical application windows, including allowing user 102 to manipulate windows. Illustrative examples of window manipulation commands, which may also be described as events, include, but are not limited to opening new windows, closing windows, resizing windows, moving windows, arranging windows, or activating/deactivating windows. For example, graphics engine 120 may receive input from user 102 via input device 122, and in turn manipulate one or more graphical applications windows based on such user input.

Input device 122 is generally any device that receives input from user 102, such as data and/or control signals. For example, input device 122 can be a keyboard, a keypad, a mouse, a trackball, a touch pad, a light pen, a pointing stick, a touch screen, a microphone, a camera, a motion detector, etc. Generally, user 102 interacts with a graphical user interface utilizing input device 122, such as a keyboard and/or a mouse. Any graphical user interface is typically provided to one or more display devices 124. Display device 124 and input device can be one component, such as a touch screen. However, display device 124 can be a separate component, such as a television, a screen, or a computer monitor. For example, illustrative possible display devices 124 include a liquid crystal display (LCD) screen, a thin film transistor liquid crystal display (TFT-LCD), a cathode ray tube (CRT) monitor, a high-definition television, and a plasma display.

FIGS. 2A-2D illustrate examples of one application's graphical application window attached to another application's graphical application window. Any graphical application window of one application can be attached to another graphical application window of another application. Applications 140-1, 140-2 may include user applications that provide at least one graphical application window. Such a window may allow a user 102 to receive, request, or provide information (e.g., browse the Internet and interact with a web site). For example, applications 140-1, 140-2 can be any of a number of productivity applications or part of a productivity software suite, such as Microsoft Office®, OpenOffice, etc. Further, applications 140-1, 140-2 can be a web browser, an information widget (e.g., a clock, a weather guide, a stock ticker, etc.), or a communications program. Examples of communications programs include, but are in no way limited to, an instant messaging client, a text messaging client, an e-mail client, a telephone controller, a conference calling program, a voice over Internet Protocol (VoIP) communications program, a contacts manager, an address book, a webcam program, or a conversation toolbar Further, such windows can be attached in nearly any configuration, location, and orientation. In addition, multiple windows of multiple applications can be attached to another window. For example, as illustrated in FIGS. 2A-2D, a graphical conversation toolbar window 210 is attached to a graphical instant messaging client window 220. In FIGS. 2A-2D, a first window 210 of the first application, the toolbar, is attached to a second window 220 of the second application, the instant messaging client.

Figures 2A, 2B:
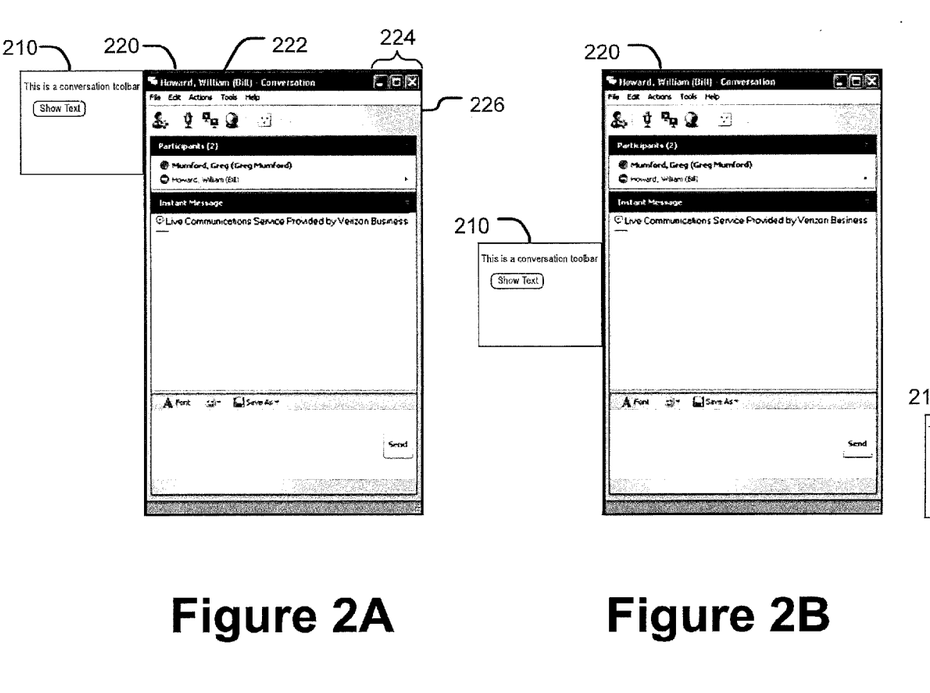
FIGS. 2A-2D illustrate examples of one application's graphical application window attached to another application's graphical application window.
Figure 2C:
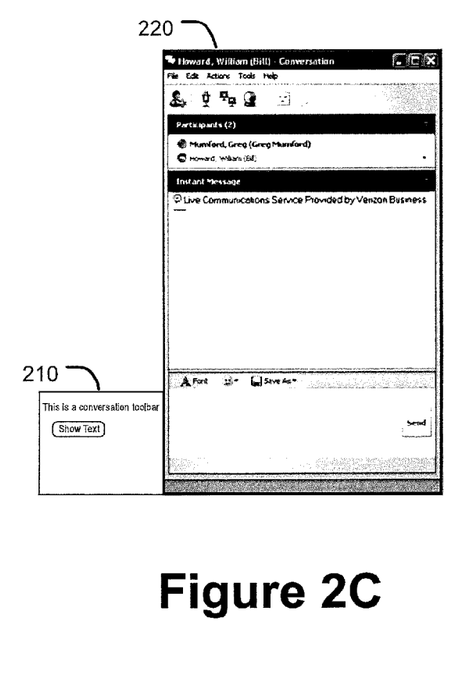

As shown in FIG. 2A, window 210 is attached to the top left corner of window 220, and in FIG. 2C, window 210 is attached to the bottom left corner of window 220. In FIG. 2B, window 210 is attached to the left side of window 220, approximately about midway between the top and bottom of window 220. Window 220 is associated with an instant messaging client, while window 210 is associated with a separate application, a conversation toolbar. As previously discussed, the applications are separate in that one is not integrated with the other. For example, the conversation toolbar application is not a plug-in, add-on, extension, or otherwise integrated with the instant messaging application. Generally, separate applications have separate application windows, which are independent of one another in that actions performed on one window have no effect on the other application window. For example, in the case of separate applications, closing the window of one application does not affect the application or application window of a separate application.

However, as described in more detail below, the illustrated application windows 210, 220, are attached so as to mimic an integrated application and thus the two separate windows will move, open, and close nearly simultaneously, even though they are associated with separate applications. Thus, windows 210, 220 appear to user 102 as an integrated application, as if the toolbar application was in fact an extension of the instant messaging client. Thus, certain actions taken by user 102 via input device 122 with respect to either window 210 or 220 may affect the other window. For example, moving one window will automatically move any attached windows, thus maintaining a spatial relationship between the attached windows. Further, minimizing or closing one attached window will also cause any other attached windows to be minimized or closed.

Further, as illustrated in FIGS. 2A-2D, one window may be customized to modify the appearance of a window so that the attached windows look more like an integrated application. For example, as show in FIGS. 2A-2D, window 220 includes a title bar 222, window controls 224, and a border 226. However, window 210 is without such features, as window 210 does not have a title bar, window controls, or a border. Thus, window 210 is configured to appear as an integrated part of window 220, even though windows 210, 220 are associated with separate applications.

Figure 2D:
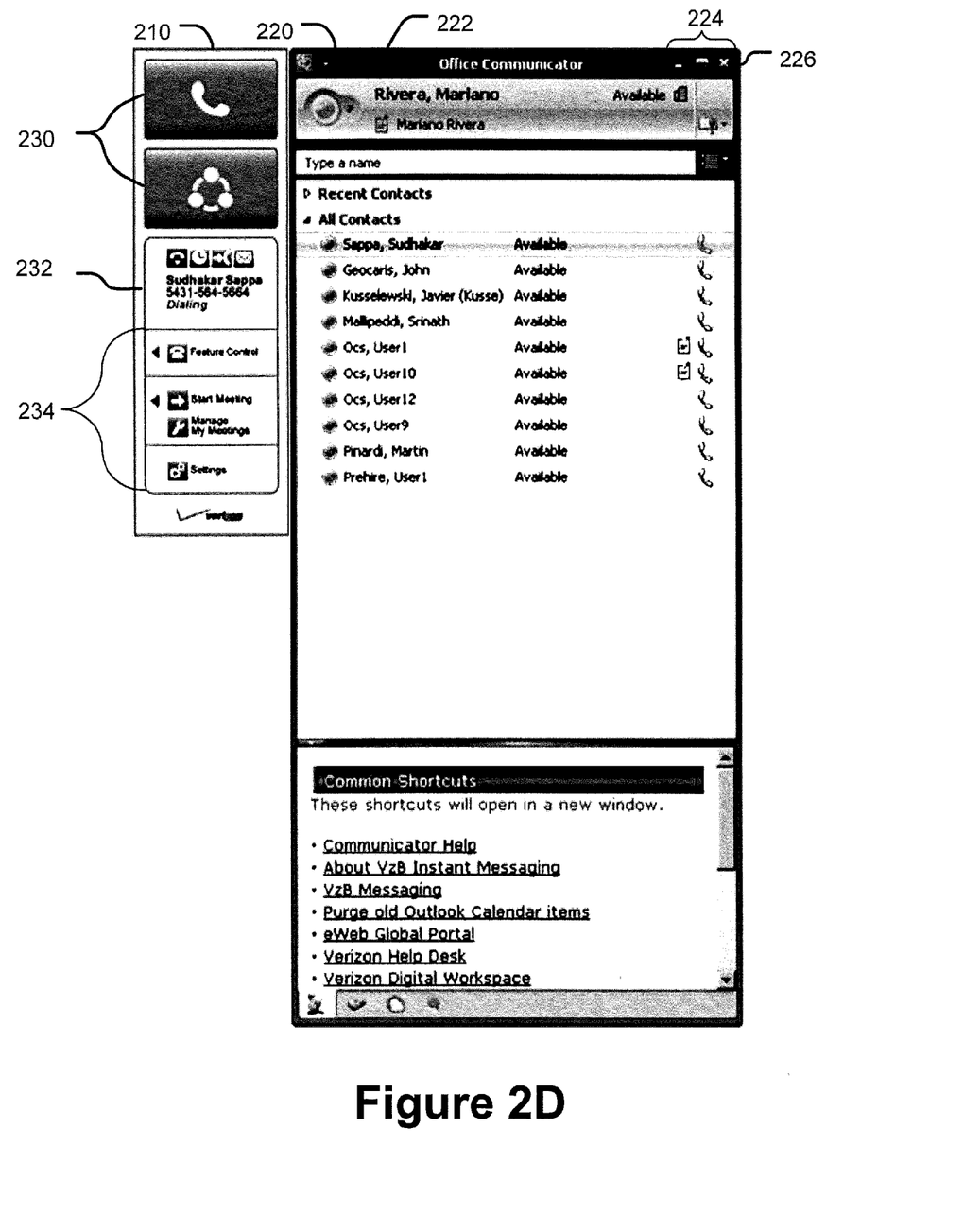

As previously discussed, computing device 110 utilizes graphics engine 120 to provide the various application windows. Graphics engine 120 may be part of an operating system and/or a graphical user interface software program. As illustrated in FIG. 2D, window 210 may also include application controls 230, an information window 232, and sub-menu links 234. Graphics engine 120 may provide certain functionality to allow user 102 to share information between two graphical application windows, such as by using a drag and drop feature as is known. Typically, a user can drag and drop information between certain application windows regardless of whether the applications are separate or integrated with one another. However, when two windows are attached, they can maintain a physical proximity to one another, and can be brought in front of other windows (e.g. activated) nearly simultaneously. Thus, attaching two windows together greatly enhances a user's ability to utilize certain features like drag and drop.

For example, as illustrated in FIG. 2D, window 220 is an office communicator displaying a contact list alone with that user's status (e.g., available to chat, unavailable to chat, or not signed in). User 102 could drag and drop a contact (e.g., Sudhaker Sappa) from window 220 onto an application control 230 (e.g. a call or conference call button) of window 210, and use the first application (e.g. the toolbar) to establish a call with the contact. Such drag and drop activities between two different applications are easier to facilitate when the application windows 210, 220 of the two applications are attached because both windows 210, 220 maintain their physical proximity to one another and are both visible at the same time. Thus, there is no need to rearrange multiple windows on a user's desktop in order to display both windows 210, 220 simultaneously as both act in concert.

Figure 3A:
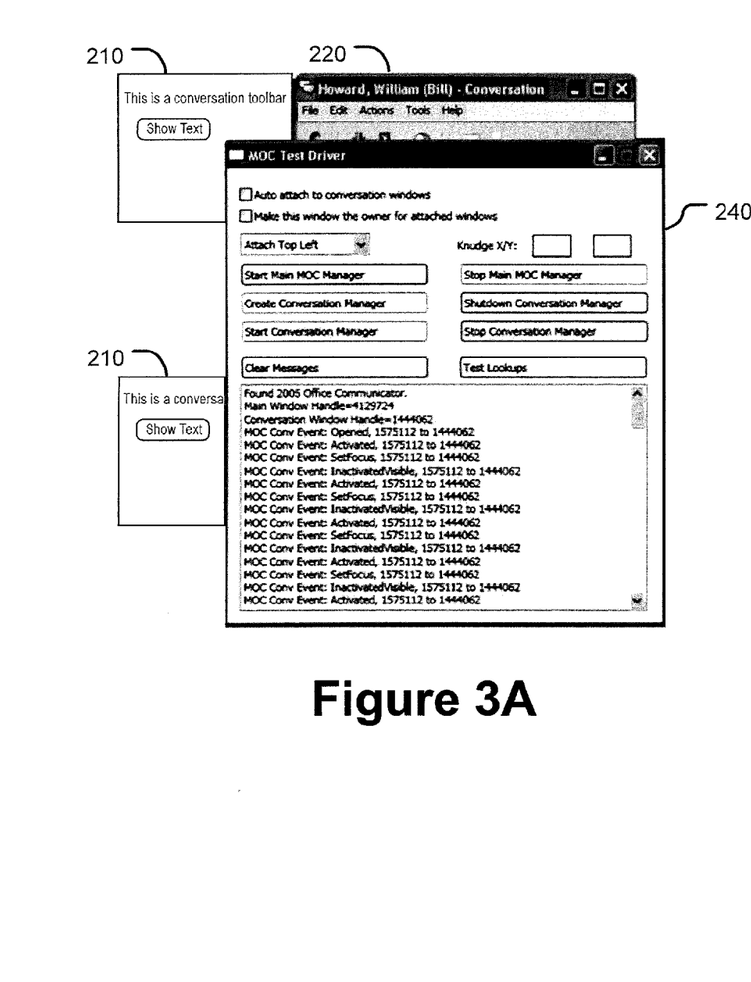
FIGS. 3A-3B illustrate examples of multiple graphical application windows attached to another application's graphical application window.
Figure 3B:
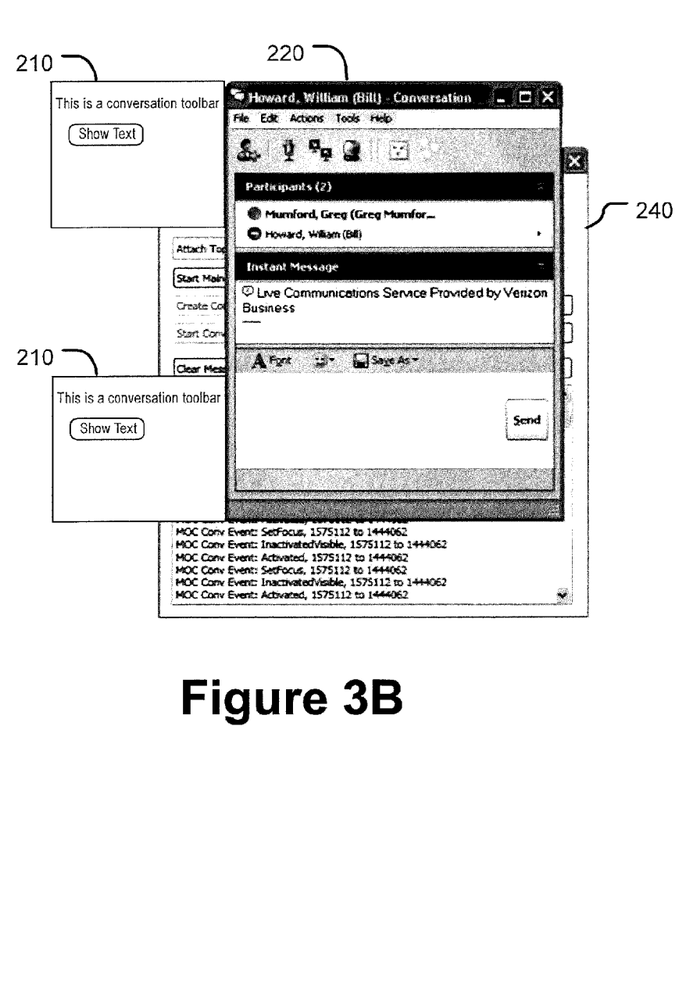

FIGS. 3A and 3B illustrate an example of multiple graphical application windows 210 attached to another application's graphical application window 220. As illustrated in FIG. 3A, windows 210, 220 are behind another application window 240, as happens when user 102 opens multiple windows from multiple applications. Many operating systems and other graphical user interface applications allow windows to overlap one another. Typically, the overlapping order can be described as the Z-order of the windows, where the Z-order of the windows will determine which of the overlapping windows will appear on top of the other window. Since windows 210 and 220 are attached to one another, any action taken with respect to windows 210 or 220 affects the attached windows. Thus, when one window is activated or brought to the top of the Z-order, the other, attached windows are also activated or brought above other windows in the Z-order so that both windows are displayed. As illustrated in FIG. 3B, all three windows 210, 220 are in front of window 240. For example, if user 102 were to click-on or otherwise activate any one of windows 210, 220, all of the attached windows are also brought to the top of the z-order.

Figure 4:
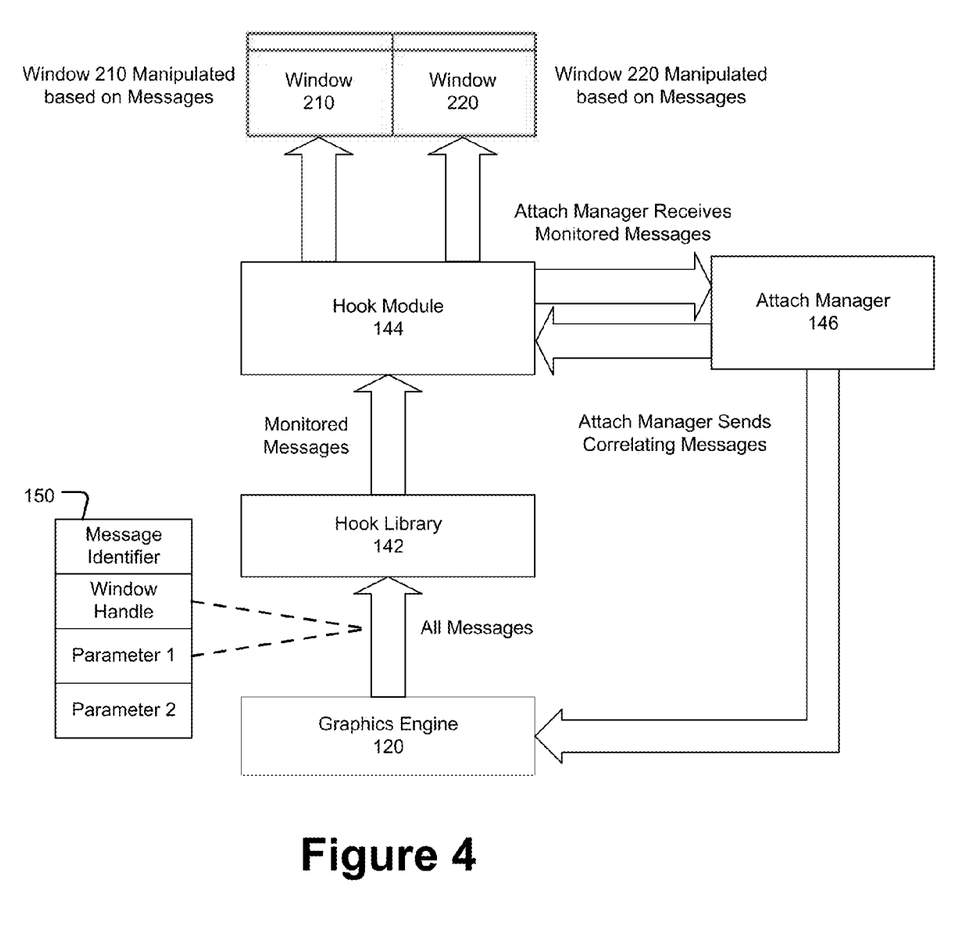
FIG. 4 illustrates how an exemplary computing device attaches multiple application windows using messages.

FIG. 4 illustrates how computing device 110 attaches and manages multiple application windows. As previously discussed, computing device 110 includes multiple separate applications 140-1, 140-2 where each can generate one or more graphical application windows. In one example, window 210, which is associated with a first application 140-1, is attached to window 220, which is associated with a second application 140-2 that is separate from first application 140-1. Computing device 110 can use messages to attach windows 210, 220 to one another, such that actions performed on one window may affect the other window.

Generally, computing device 110 includes graphics engine 120, such as an operating system or other graphical user interface application that manages the various windows using messages. In an example using one of the Microsoft Windows® operating systems, the operating system generally creates and routes the messages to an appropriate window and/or application. However, such messages can be monitored, filtered, intercepted, and even replaced with other messages, thus allowing computing device 110, utilizing hook library 142, hook module 144, and attach manager 146, to manipulate certain windows to appear as if they are attached to one another. Such windows appear attached, for example, by maintaining a pre-determined proximity, orientation, and ensuring that both behave similarly when one is manipulated.

Graphics engine 120 may utilize messages to communicate with and control the various graphical application windows, such as windows 210, 220. Such messages can be sent to a procedure, sub-routine, or sub-program for processing. For example, such messages can be sent to a window procedure that is associated with one specific graphical application window. Typically, such messages are generated by both graphics engine 120, an application 140, and attach manager 146. For example, graphics engine 120 may generate a message after receiving input from user 102 via input device 122, such as when user 102 types on a keyboard, moves a mouse or touchpad, clicks a control such as a scroll bar, interacts with a touch screen, etc. Graphics engine 120 also generates messages in response to changes in computing device 110 brought about by an application 140, such as when application 140 changes the pool of system font resources or resizes one of its own graphical application windows.

Application 140 can generate messages to direct its own graphical application windows to perform tasks or to communicate with the graphical application windows in other applications 140. In addition, attach manager 146 may generate correlating messages to direct the actions of one window when an action is taken with respect to an attached window. For example, when one window is manipulated (e.g. moved), then attach manger 146 may generate a correlating message to maintain a spatial relationship between the windows such that they appear to be attached to one another. In another example, attach manager 146 may replace a message with another message as well as generate a correlating message.

A message may include a message identifier that identifies the purpose of the message, for example, by identifying a particular command. Further, a message may include at least one parameter that provides additional information about the message. A message may also include a window handle that identifies the specific graphical application window to which the message pertains or for which the message is intended. Graphics engine 120 can utilize the window handle of a message to determine which window procedure should receive the message and then route the message accordingly.

Computing device 110 utilizes hook library 142 to monitor messages, and pass certain messages to hook module 144. For example, when utilizing one of the Microsoft Windows® operating systems, each application 140-1, 140-2 is assigned a message queue to route messages. Hook library 142 may monitor all or a subset of such message queues for specific messages, such as those that include a command to manipulate a window. Hook library 142 may utilize a hook to perform such monitoring. A hook is generally a mechanism by which a function, such as hook library 142, can intercept messages before they reach an application. Hook library 142 in conjunction with hook module 144 and attach manager 146 can act on messages and, in some cases, modify or discard them. Hook library 142 may be a dynamic link library (DLL) that utilizes a global hook to monitor or hook all desktop applications. Hook library 142 can monitor messages 150 for those that relate to and/or are intended for one of the attached windows, such as windows 210 and 220.

A message may include a message identifier, a window handle, and one or more parameters, as shown in FIG. 4. Hook library 142 can identify such messages by matching a window handle to the attached windows 210, 220, for example. Hook library 142 may hook all desktop applications and monitor them for Win32 messages that are needed to manage the various attached windows. Such messages may have a message identifier including, but not limited to any of the following: WM_MOVING, WM_MOVE, WM_CREATE, WM_DESTROY, WM_SIZE, WM_SIZING, WM_SHOWWINDOW, WM_SETFOCUS, or WM_ACTIVATE. Such message identifiers relate to various window actions that could manipulate a window, including moving a window, creating a new window, destroying or closing a window, resizing a window, showing a window, hiding a window, activating a window, and deactivating a window. These messages are then relayed to hook module 144. In one example using one of the Microsoft Windows® operating systems, the identified messages 150 are relayed as custom registered Microsoft Windows® messages so that the messages are customized specifically for communication between hook library 142 and hook module 144. For example, such messages may include a message identifier with a specific abbreviation appended to each identifier.

While hook library 142 may monitor all messages for a window handle identifying one of the attached windows, hook library 142 may also utilize various filtering processes. For example, hook library 142 may also filter by message identifier. As previously discussed, a message identifier identifies the purpose of the message. Hook library 142 may be configured to only review messages that could cause a window action, such as moving a window, resizing a window, opening or closing a window, activating or deactivating a window, etc. Further, hook library 142 may filter messages 150 even further, for example, through sampling. For example, hook library 142 may detect many move messages for one of the attached windows, but only forward one of every fifty or so move messages to hook module 144. Thus, messages 150 from graphics engine 120 can be filtered based on a window handle, a message identifier, through sampling or any combination thereof in one exemplary approach.

Messages 150 that are received from graphics engine 120 are then forwarded to hook module 144. In one example, hook library 142 first converts messages 150 into custom registered Windows messages before sending messages 150 onto hook module 144. In one example, messages 150 are converted by adding a prefix to each windows identifier. Hook module 144 may be configured to only process messages 150 that include a message identifier with that particular prefix.

Hook module 144 provides a message conduit between hook library 142 and windows 210, 220. Further, hook module 144 communicates with attach manager 146, allowing attach manager 146 to send additional messages 150 to windows 210, 220. Hook module 144 can provide a single (static) message pump (WinProc) for processing messages 150. A message pump, as is known, is generally a programming construct that waits for and dispatches messages in a program, such as hook module 144. Hook module 144 also communicates with attach manager 146, such as by raising the received messages as events for attach manager 146 to process.

Computing device 110 can create multiple instances of hook module 144. An instance is generally a separate process or thread of the same application. Each instance may be called or run with different variables or attributes. For example, computing device 110 may create multiple instances of hook module 144 and associate one instance of hook module 144 with each application 140-1, 140-2. In one example with multiple instances of hook module 144, the first instance of hook module 144 also creates a message pump for processing messages 150. When the last instance of hook module 144 is terminated, it will also terminate the message pump. In such an example, the message pump is a Window object that receives messages 150 from hook library 142. However, the message pump is not displayed and simply provides a Win32 handle and window that receives messages 150 from hook library 142, providing a message conduit between hook library 142 and attach manager 146.

Figure 5:
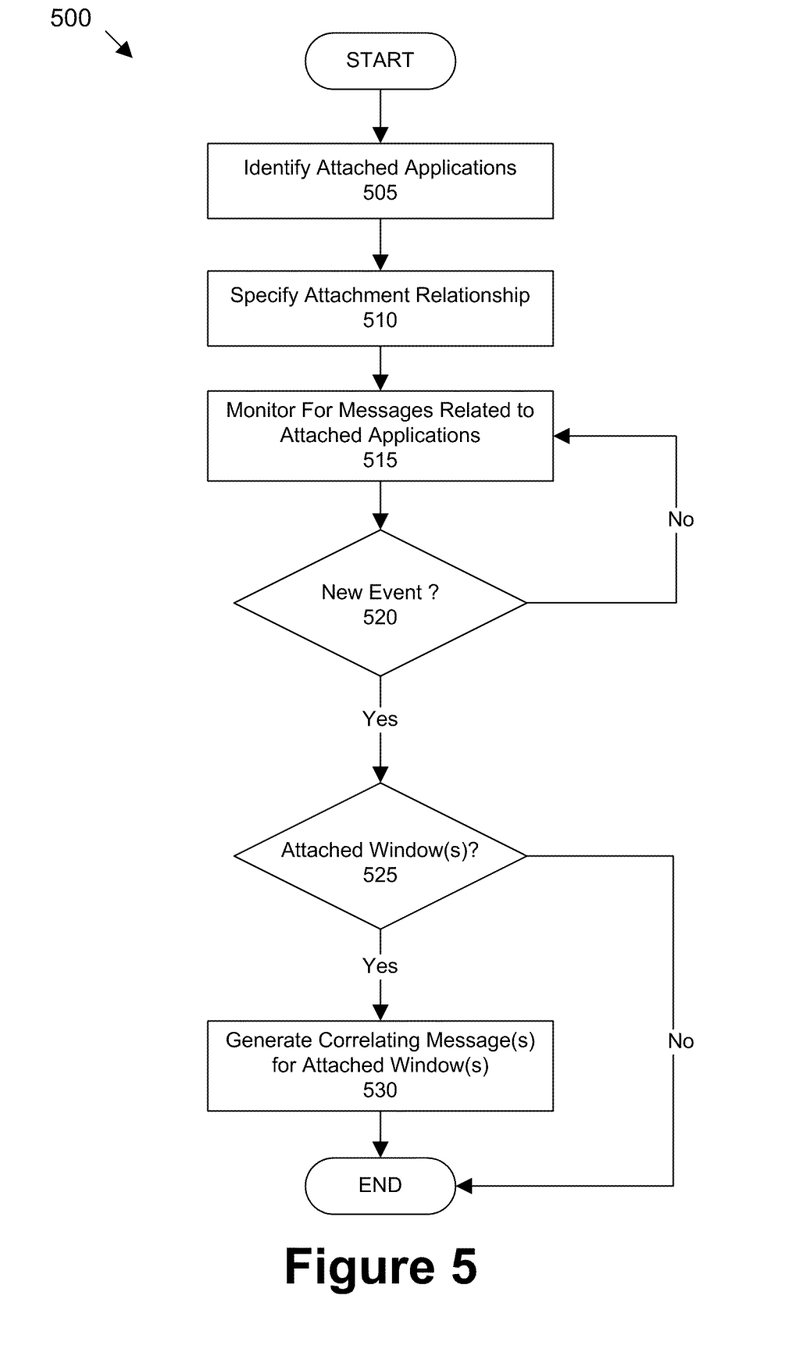
FIG. 5 illustrates an exemplary process for attaching windows of separate applications to one another.

Attach manager 146 manages the various attached windows by receiving messages from hook module 144 and providing correlating messages according to an attachment relationship. For example, attach manger 146 may review messages 150 received by hook module 144, and generate additional messages 150, e.g. correlating messages, that affect a window, as illustrated by way of process 500. Further, computing device 110 can utilize multiple instances of attach manager 146. For example, each instance of attach manager 146 can be used to manage windows of one or more windows classes. As is known with one or more of the Microsoft Windows® operating systems, each window class has an associated window procedure shared by all windows of the same class. The window procedure processes messages for all windows of that class and therefore controls their behavior and appearance. Each instance of attach manager 146 can manage a different class of window so that the application is notified of events (such as a new window created) specific to the class of window being managed. In response to such messages, as illustrated with respect to process 500, attach manager 146 can generate a correlating message to manipulate one or more windows according to an attachment relationship, such as by maintaining a pre-determined physical proximity between the windows.

FIG. 5 illustrates an exemplary process 500 for attaching windows of separate applications to one another. Process 500 begins in step 505 by identifying which applications will be attached. For example, the windows and/or applications that will be attached to one another are identified. Such applications can be identified using an application identifier, such as a class name. A class name typically identifies a specific application because window classes are process specific, and therefore a window class name is specific to a particular process, which is associated with a particular application.

Such identifiers can be located dynamically, or can be pre-programmed. Examples of class names include "LCCBLClass" and/or "IMWindowClass" for Microsoft Office Communicator 2005, and "IEFrame" for Microsoft Internet Explorer. Typically, at least two applications are identified, and the two applications are separate in that one is not a part of the other, such as an add-on, plug-in, or otherwise integrated with the other application.

Identifying such applications can be done manually or automatically. For example, attach manager 146 may provide a graphical user interface that allows user 102 to manually select multiple windows and/or applications to attach to one another. For example, such a graphical user interface may allow a user to select specific windows and/or applications, and further specify a specific attachment relationship. As user 102 selects an application, for example, attach manager 146 can search for and store an application identifier associated with the selected application.

Figure 6:
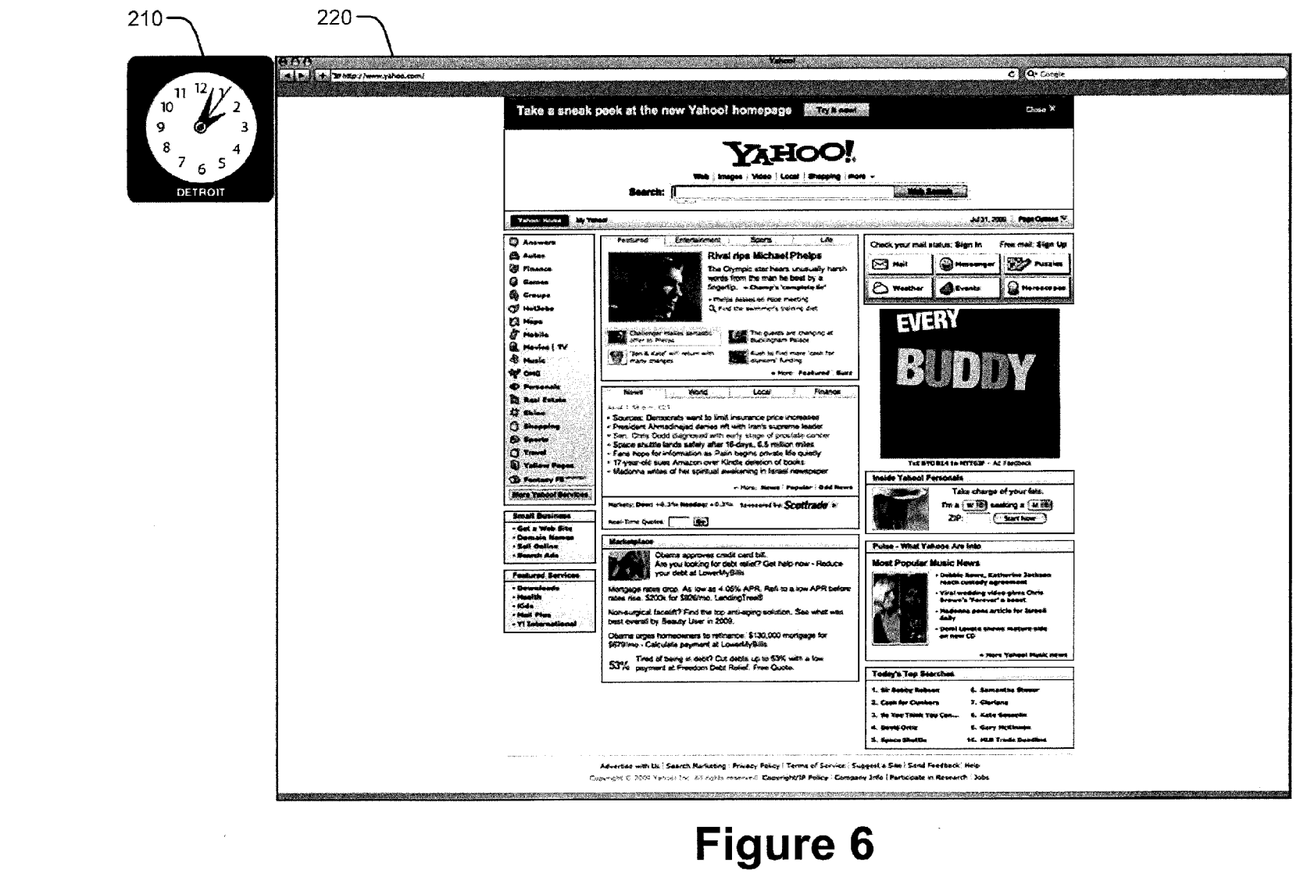
FIG. 6 illustrates an example of a clock application window attached to a web browser application window.

In another example, various windows and/or applications can be identified automatically. For example, attach manger 146 can be pre-programmed to attach certain windows to one another, such as by attaching a communications toolbar to a communications application, as illustrated in FIG. 2D. Further, as illustrated in FIG. 6, a time application that provides a clock window 210 is attached to a web browser application that provides a web browser window 220. For example, such applications may include a static application identifier. Therefore, such an application identifier can be pre-programmed, and therefore any windows associated with such applications can be automatically identified using the application identifier, such as a class name.

Next, in step 510, an attachment relationship is specified. An attachment relationship generally specifies how the graphical application windows associated with the identified applications will be attached to one another. For example, an attachment relationship may specify a spatial relationship between the attached windows, such as by specifying a physical proximity between the windows. Further, an attachment relationship may specify that certain portions of a window be in contact with one another, or that they be adjacent to one another. In one example, attach manager 146 provides a graphical user interface that allows user 102 to specify the attachment relationship. In another illustrative example, an attachment relationship can be pre-determined and specified by a designer of one of the applications.

Such an attachment relationship can include, but is not limited to, the location of one window relative to another, the proximity of one window relative to the other, and an orientation of the windows (e.g. locating one at or near a specific corner of another). Further, an attachment relationship may specify certain behavior (e.g. whether one window is resized if the other window is resized, opening and attaching a new window of one application if a new window of another application is opened). The attachment relationship may define a spatial relationship between the windows. For example as shown in FIG. 2D, the spatial relationship may be defined by relative locations, such as by specifying that an upper right-hand corner of window 210 is located adjacent to an upper left-hand corner of window 220.

In another example, a spatial relationship can be defined in terms of X-Y (e.g. vertical and horizontal) distance between a point on each window, such as X and Y distances between corners of each window. In another illustrative example, computing device includes a global coordinate system that describes the viewable space of a display device 124. The location of one window may be described in terms of the global coordinate system. An attachment relationship may be specified by a local coordinate system that defines a window's location in terms of a point on a window, or some other relative location with respect to another window. For attached windows, when one window is moved, the other window will also be moved to maintain the attachment relationship, such as by maintaining a pre-determined spatial relationship. For example, attach manager 146 may receive a message identifying a position of a window in terms of a global coordinate system that describes the viewable area of one or more display devices 124. In response to a command to move an attached window, attach manger 146 may generate a correlating command to move any attached windows based on an attachment relationship. In such an example, the attachment relationship may describe a spatial relationship between the attached windows in terms of a local coordinate system, such as in terms of a vector between two points on the windows.

An attachment relationship may also specify that how the appearance of one window is modified. In one example attach manager 146 can remove one or more of the following from a window: a title bar, one or more window controls (e.g. buttons for opening, minimizing, maximizing, restoring, or closing), a border, a resizable frame, a title bar, and an icon. Thus, by removing such items from a window, such as window 210, window 210 can appear as though it is integrated with window 220, thus making the two separate applications appear as one unified graphical application window, even though the windows are associated with separate applications.

Next, in step 515, computing device 110 monitors messages 150 for those messages that relate to a window of one of the identified applications and/or windows. In one example, the identified applications are hooked using hook library 142. For example, hook library 142 can receive some criteria from attach manger 146, monitor all desktop messages from graphics engine 120, and then forward messages that meet the criteria to hook module 144. For example, such criteria may include a particular application identifier, a search string, a class name, a window handle, or other types of information that may result in establishment of module criteria to hook module 144.

Next, in step 520, computing device 110 determines if the message is an event. Events can be a subset of messages that relate to actions that affect one or more of the attached windows. An event may be a command to manipulate a window. For example, graphics engine 120 may receive input from input device 122 regarding user 102 moving a mouse, and in turn generate messages 150 describing the movements of the mouse cursor across display device 124. However, simply moving a mouse may not affect any of the attached windows, and therefore may not qualify as an event. Attach manger 146 may instruct hook library 142 to watch for messages related to certain applications, and further specify the types of messages that would be considered events. Accordingly, the criteria provided to hook library 142 may include a list or array of specific events, such as a list of specific windows identifiers. Such events may include, but are not limited to, opening a window, closing a window, minimizing a window, minimizing all windows, restoring a window, activating/deactivating a window, or setting focus on a window. In one example, hook library 142 monitors all messages, identifies messages that relate to one of the attached applications, determine if the message is a new event that would affect one of the attached windows, and then forward the message to hook module 144. If the message is not an event, computing device 110 returns to step 515. If the message is an event, then computing device 110 continues to step 525.

In step 525, computing device 110 checks for attached windows. Specifically, computing device 110 determines whether the window identified in the received message has an associated attached window. In one example, attach manager 146 maintains a listing of all attached window pairings. In another example, attach manager 146 maintains a database or data table of all windows associated with the applications identified in step 505, the attachment relationships, and a status that identifies whether a window is currently attached to another window. Specific windows associated with the applications identified in step 505 can be identified using a window identifier, if known. Specific windows can also be found by searching the window text of all open graphical application windows. For example, each graphical application window includes certain text or attribute data that can be used to identify the application associated with the window. In one illustrative approach, attach manager 146 may search through all window text and/or attribute data to match a particular pattern associated with a specific application, a group of applications, or the like. For example, attach manger 146 could search through all open windows, and search for a specific class name or match part of a class name.

Additionally in step 525, computing device 110 could determine whether a new window needs to be opened and then attached to a graphical application window. An attachment relationship may specify that a communications toolbar application window will be attached to each communications application window. However, if no toolbar windows are open when a communications application window opens, computing device 110 may initiate and crate a new toolbar window. For example, hook library 142 may identify a window create message associated with one application, check the attachment relationship associated with that application, then open another window of a particular application and attach the windows to one another according to the attachment relationship.

In step 530, computing device 110 generates a correlating message for the identified attached window. Such a message may be based on the attachment relationship specifying how the attached windows should behave. For example, if a message specifies to move one window, attach manager 146 will generate a correlating message for all attached windows to move them in such a way as to maintain the pre-determined attached relationship. For example, such a correlating message may move the attached window(s) such that the attached windows maintain the same spatial relationship. Such a move message may be defined as a vector having both an angle and a specified distance, and attach manager 146 will generate a correlating message to move each attached window according to the vector. In one example, attach manger 146 tracks various activities related to the windows associated with applications identified in step 505, such as certain events relating to those windows. Such events may include, for example, movement, sizing, minimizing, maximizing, changing the z-order, or the like of one of the windows. Attach manager 146 will then generate a correlating message for the attached window to ensure that the attached windows act as one window, according to their attachment relationship. For example, attach manager 146 may generate correlating messages to ensure that both windows open, close, move, and minimize nearly simultaneously. As illustrated in FIG. 4, attach manager 146 may provide such correlating messages to hook module 144, graphics engine 120, a windows process, or some other module that can manipulate a window based on a message. Following step 530, process 500 ends.

Attach manager 146 may also perform additional operations related to managing attached windows. For example, attach manager 146 can open an application, create a window, and attach the window to another application's graphical application window automatically. For example, attach manger 146 can be pre-programmed to attach a communications toolbar to any communications application. In such an example, attach manager 146 may wait for a specific application to open, such as when user 102 initiates a communications application. Then, attach manger 146 may initiate a communications toolbar application, and attach a communications toolbar window to each communications application window automatically.

Further, attach manager 146 may also initiate one or more instances of other modules, including hook library 142, hook module 144 and additional instances of attach manager 146. In one example, attach manager checks to see if an instance of hook library 142 is running. If no instance of hook library 142 is running, attach manager 146 imitates an instance of hook library 142. Attach manager 146 may perform the same routine for hook module 144 as well. In another example where applications to be attached to one another are per-determined, attach manager 146 will auto-create and attach windows for any existing windows when attach manager 146 is first initiated. Additionally, attach manager 146 may include logic to prevent infinite loops, such as by tracking certain messages. For example, where multiple windows are attached to one another, attach manager 146 may track messages and therefore determine that no correlating message is required because a particular window already received a particular message. Thus, attach manager 146 may intercept certain messages, preventing a message from affecting a specific window. Attach manager 146 may also replace a message, such as when an attached window receives a maximize command.

In yet another example, attach manager 146 can be configured to calculate and/or estimate a position of one window relative to another. For example, attach manger 146 may determine that one attached window is being moved by user 102 dragging the window. Attach manager 146 can sample the move messages, identify the attached window(s), calculate a new position for the attached window(s) by calculating an offset from the moving window, and generate correlating messages for the attached window(s). For example, two windows may be attached to one another, but they may be spaced apart from one another on a user's desktop. While the drawings illustrate multiple windows nearly touching one another, one will recognize that the relative location of the attached windows is arbitrary and can be based on any location, relative distance, orientation, etc. The fact that such windows are attached generally refers to the concept that such windows may perform certain actions in concert, such as by performing certain actions nearly simultaneously with one another.

An attachment relationship may specify that all attached windows should remain visible at all times when another attached window is visible (e.g. activated, moved, or maximized). Thus, attach manager 146 may be configured to handle certain events differently than other events, according to the attachment relationship. For example, when an event specifies that a window is to be maximized, attach manger 146 may intercept the message and replace the maximize command with one or more commands, such as a resize command and/or a move command. Attachment manager 146 therefore modifies the window maximize event to merely resize and/or move the window in order to maintain viewing space for the attached window. Thus, attach manger 146 may effectively intercept a message intended for one window, and replace the message with one or more correlating messages. Then, attach manager 146 will also send a correlating message to the attached window or windows to also resize and/or move them, based on the attachment relationship.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
    monitoring, via a computing device, messages generated by a graphics engine of the computing device for graphical application windows each associated with a separate application having a pre-programmed application identifier;
    identifying at least some of the graphical application windows based on a common application identifier of the respective applications to which the at least some of the graphical application windows are associated;
    defining one or more attachment relationships between the at least some of the graphical application windows, including an attachment relationship between a first graphical application window and a second graphical application window, the first graphical application window and the second application window being pre-programmed to be automatically attached to each other;
    selecting those messages that:
        are directed to any of the graphical application windows that are the subject of any attachment relationship, and
        include a command specifying a manipulation of an appearance of the graphical application window to which the respective message is directed;
    determining, for only each of the selected messages, whether to generate a correlating command for the respective selected message, wherein a given message of the selected messages is directed to the first graphical application window and includes an original command to manipulate an appearance of the first graphical application window, and the determining whether to generate the correlating command for the given message is based at least in part on whether the appearance of the second graphical application window has already been manipulated in a manner corresponding to the manipulation specified by the original command;
    automatically generating in the computing device, for only each of the selected messages for which a correlating command is determined to be generated, the respective correlating command, where the correlating command for the given message specifies a manipulation of the appearance of the second graphical application window that corresponds to the manipulation specified by the original command of the given message; and
    automatically attaching the first graphical application window and the second graphical application window based on the pre-programmed relationship between the first graphical application window and the second graphical application window;
    wherein defining the attachment relationship between the first and second graphical application windows includes specifying how the appearance of one of the first and second graphical application windows is modified such that the first and second graphical application windows appear as one unified graphical application window.

2. The method of claim 1, wherein the original command of the given message includes a move command to move the first graphical application window according to a vector; and the correlating command for the given message is a move command to move the second graphical application window according to the same vector.

3. The method of claim 1, wherein defining the attachment relationship between the first and second graphical application windows further comprises specifying the spatial relationship between the first and second graphical application windows.

4. The method of claim 3, wherein the spatial relationship includes a relative distance between a point on the first graphical application window and a point on the second graphical application window.

5. The method of claim 1, wherein potential manipulations of the respective appearances of the graphical application windows include moving, opening, closing, creating, destroying, minimizing, maximizing, restoring, activating, deactivating, and arranging the respective graphical application windows.

6. The method of claim 1, further comprising sampling the selected messages such that the determining is performed for only a subset of the selected messages.

7. The method of claim 1, further comprising:
identifying a position of a window in a global coordinate system;
defining, in the attachment relationship between the first and second graphical application windows, the spatial relationship between the first graphical application window and second graphical application window in terms of a local coordinate system; and
generating the correlating command for the given message based on the global and local coordinate systems.

8. A method, comprising:
monitoring, in a computing device, a plurality of messages that are generated by a graphics engine of the computing device for graphical application windows;
identifying applications that are separate from one another, wherein each application has a pre-programmed application identifier and is configured to provide one of the graphical application windows;
identifying at least some of the graphical application windows based on a common application identifier of the respective applications providing the at least some of the graphical application windows;
specifying one or more attachment relationships between the at least some of the graphical application windows; and
generating respective correlating commands for only those messages of the plurality of messages that:
are directed to any of the graphical application windows that are the subject of any attachment relationship, and
include a command specifying a manipulation of an appearance of the graphical application window to which the respective message is directed, the graphical application window to which the respective message is directed being a target window,
automatically attaching an attached window to the target window, the attached window being one of the identified graphical application windows that is pre-programmed to be automatically attached to the target window of the corresponding message;
wherein each correlating command specifies a manipulation of an appearance of an attached window that corresponds to the manipulation of the appearance of the target window specified in the corresponding message; and
wherein the one or more attachment relationships includes modifying the appearance of the attached window such that the target window and the attached window appear as one unified graphical application window.

9. The method of claim 8, further comprising:
identifying a position of a first graphical application window of the graphical application windows in a global coordinate system;
defining, in one of the attachment relationships, a spatial relationship between the first graphical application window and a second graphical application window of the graphical application windows in terms of a local coordinate system; and
when a given message of the plurality of messages is directed to one of the first and second graphical application windows and includes a command specifying a manipulation of an appearance of the target window, generating the correlating command for the given message based on the global and local coordinate systems.

10. The method of claim 8, wherein one of the attachment relationships is between a first graphical application window of a first application and a second graphical application window of a second application, the method further comprising:
identifying a window create message associated with the first application; and
in response to identifying the window create message associated with the first application:
determining whether the second application is running; and
when it is determined that the second application is not running, then initiating the second application.

11. The method of claim 8, further comprising:
identifying a window maximize message associated with one of the graphical application windows that is the subject of one of the attachment relationships;
preventing the message from affecting its intended window; and
substituting a window resize and move message for the window maximize message.

12. The method of claim 11, wherein the resize message is configured to resize the graphical application window such that any attached graphical application windows are viewable on a desktop space.

13. The method of claim 10, further comprising:
incident to said initiating the second application, generating a window create message to create the second graphical application window;
determining a location of the first graphical application window; and
generating a window move message to move the second graphical application window according to a spatial relationship specified in the attachment relationship between the first and second graphical application windows.

14. The method of claim 8, wherein one of the attachment relationships is between a first graphical application window of a first application and a second graphical application window of a second application, the method further comprising:
receiving a command to close the first graphical application window; and
in response to receiving the command to close the first graphical application window, generating a command to close the second graphical application window.

15. The method of claim 8, further comprising filtering the monitored messages based on at least one of a window identifier, an application identifier, and a message identifier.

16. A system, comprising:
a computing device including:
a graphics engine configured to generate a plurality of messages for graphical application windows each associated with a separate application having a pre-programmed application identifier;
an attach manager executed in the computing device and configured to identify at least some of the graphical application windows based on a common application identifier of the respective applications with which the at least some of the graphical application windows are associated, and to manage the at least some of the graphical application windows according to at least one attachment relationship; and
a hook library configured to:
monitor the plurality of messages generated by the graphics engine,
identify those messages of the plurality of messages that are directed to any of the graphical application windows managed by the attach manager and that include a command for manipulating an appearance of the graphical application window to which the respective message is directed, the graphical application window to which the respective message is directed being a target window, and
pass only the identified messages to the attach manager, wherein the attach manager is further configured to:
receive the messages passed from the hook library, and,
generate respective correlating commands for the received messages, wherein each correlating command specifies a manipulation of an appearance of an attached window that corresponds to the manipulation of the appearance of the target window specified in the corresponding message, the attached window being one of the graphical application windows that is pre-programmed to be automatically attached to the target window of the corresponding message;
wherein the attach manager is further configured to automatically attach the attached window to the target window based on the pre-programmed relationship between the attach window and the target window; and
wherein the at least one attachment relationship includes modifying the appearance of the attached window such that the target window and the attached window appear as one unified graphical application window.

17. A non-transitory computer-readable medium tangibly embodying computer-executable instructions for:
monitoring, in a computing device, a plurality of messages that are generated by a graphics engine of the computing device for graphical application windows each associated with a separate application having a pre-programmed application identifier;
identifying at least some of the graphical application windows based on a common application identifier of the respective applications to which the at least some of the graphical application windows are associated;
specifying one or more attachment relationships between the at least some of the graphical application windows that are provided by applications that are separate from one another;
generating respective correlating commands for only those messages of the plurality of messages that:
are directed to any of the graphical application windows that are the subject of any attachment relationship, and
include a command specifying a manipulation of an appearance of the graphical application window to which the respective message is directed, the graphical application window to which the respective message is directed being a target window,
automatically attaching an attached window to the target window, the attached window being one of the identified graphical application windows that is pre-programmed to be automatically attached to the target window of the corresponding message
wherein each correlating command specifies a manipulation of an appearance of the attached window that corresponds to the manipulation of the appearance of the target window specified in the corresponding message; and
wherein the one or more attachment relationships includes modifying the appearance of the attached window such that the target window and the attached window appear as one unified graphical application window.

18. A method as set forth in claim 1, further comprising transmitting the correlating command, which is duplicated from the original command, to the second graphical application window if the second graphical application window has not been manipulated in accordance with the original command.

19. A method as set forth in claim 18, wherein transmitting the correlating command to the second graphical application window adjusts a z-order characteristic of the second graphical application window.

20. A system as set forth in claim 16, wherein the attach manager is configured to transmit the correlating command, which is duplicated from the original command, to the second graphical application window if the second graphical application window has not been manipulated in accordance with the original command.

21. A system as set forth in claim 20, wherein the attach manager is configured to transmit the correlating command to the second graphical application window to adjust a z-order characteristic of the second graphical application window.

22. A method as set forth in claim 1, wherein specifying how the appearance of one of the first and second graphical application windows is modified includes removing therefrom at least one of a title bar, at least one window control, a border, a resizable frame, and an icon.

* * * * *